United States Patent [19]

Ticks

[11] 4,277,056
[45] Jul. 7, 1981

[54] HYDRAULICALLY DAMPED RUBBER MOTOR MOUNTING

[75] Inventor: Gerd-Heinz Ticks, Birkenau, Fed. Rep. of Germany

[73] Assignee: Firma Carl Freudenberg, Weinheim an der Bergstrasse, Fed. Rep. of Germany

[21] Appl. No.: 55,463

[22] Filed: Jul. 6, 1979

[30] Foreign Application Priority Data

Feb. 10, 1979 [DE] Fed. Rep. of Germany ....... 2905091

[51] Int. Cl.³ .............................................. F16F 9/34
[52] U.S. Cl. ................................................ 267/140.1
[58] Field of Search ....................... 188/1 B, 286, 320; 267/140.1, 141.2.141.6, 141.7

[56] References Cited

U.S. PATENT DOCUMENTS

| 2,421,585 | 6/1947 | Thiry | 267/140.1 |
| 2,535,080 | 12/1950 | Lee | 267/140.1 |
| 3,888,449 | 6/1975 | Jablonski et al. | 267/140.1 |

FOREIGN PATENT DOCUMENTS

1260067 3/1961 France ................................. 267/140.1

*Primary Examiner*—Duane A. Reger
*Attorney, Agent, or Firm*—Kenyon & Kenyon

[57] ABSTRACT

A hydraulically damped rubber motor mount has a mounting flange, a motor connection above the flange, and a rubber annulus interconnecting the connection and flange and forming a hydraulic chamber. An elastically expansible and contractible hydraulic enclosure is connected with the chamber via a flow path that is at least fifty times longer than its cross-sectional area. Hydraulic fluid fills the chamber, enclosure and path. Low frequency vibration applied to the motor connection when supporting a motor, is damped by hydraulic flow back and forth between the chamber and enclosure via the flow path. Because of the length of this flow path relative to its cross-sectional area, the mount does not excessively stiffen when the motor applies high frequency vibration to the motor connection.

6 Claims, 2 Drawing Figures

HYDRAULICALLY DAMPED RUBBER MOTOR MOUNTING

BACKGROUND OF THE INVENTION

Rubber motor mounts are used to mount motors of various kinds, but are particularly important when mounting a motor of the reciprocating piston type to the chassis of an automobile. If the mounts are made stiff enough to prevent the motor from oscillating with excessive amplitude when low frequency vibration is involved, the mounts are too stiff to adequately insulate the chassis from vibration of higher frequencies. Low frequency vibration is involved when the automobile runs on a bumpy road or the motor idles roughly, and the higher frequencies are involved when the motor runs at normal operating speeds.

The West German Pat. No. 945,899 discloses a hydraulically damped rubber motor mount having a mounting flange, a motor connection above the flange and a rubber annulus interconnecting the connection and flange and forming with them a hydraulic chamber. An elastically expansible and contractible hydraulic enclosure in the form of a rubber casing is positioned beneath the flange and is connected with the chamber above the flange via a nozzle formed by one or more orifices of substantially equal length and diameter. The chamber, enclosure and nozzle are filled with hydraulic fluid.

With this design the rubber annulus which directly carries the motor weight might be made elastically flexible enough to insulate the flange, and therefore an automobile chassis, from the higher frequencies resulting from normal motor operation. At the same time, the mount provides damping for the vibrations of low frequency because the hydraulic fluid flows back and forth between the chamber and enclosure, it being possible to design the enclosure with a resonance frequency that differs from that of the hydraulic chamber carrying the motor weight.

However, for this low frequency vibration damping there is a relationship between the damping effected and the velocity at which the hydraulic fluid can flow back and forth through the nozzle. With increasing vibration frequency the dynamic damping obtained is a corresponding increasing value because the flow resistance through the nozzle increases with the flow velocity. Unfortunately, this action continues with increasing vibration frequency until the flow resistance of the nozzle is such as to, in effect, cut off the flow with the result that the hydraulic chamber mounting the motor stiffens to a degree where it cannot absorb the higher frequency vibration. In the case of an automobile installation, this means that with the motor operating at normal speed, its vibration is transmitted through the mount to the automobile chassis.

The object of the present invention is to improve on the described German patent motor mount so as to provide a mount having equal or improved low frequency damping while at the higher frequency vibrations it provides effective insulation against their transmission through the mount to its mounting flange.

SUMMARY OF THE INVENTION

This invention is based on the discovery that if the hydraulic chamber formed by the rubber annulus is hydraulically connected with the elastically expansible and contractible hydraulic enclosure through a flow path that is at least fifty times, and preferably one-hundred times, longer than its cross-sectional area or diameter, the mount not only provides improved damping in the case of vibrations of low frequencies, but also that as the vibration frequencies increase, the mount does not stiffen to a degree preventing it from effectively absorbing such vibration.

In the case of an automobile, low frequencies are considered to be vibrations typically having a frequency of up to 12 Hz. It is caused by the transmission of road shock to the motor mounts and possibly by the motor idling, particularly if the motor is not running smoothly. A properly running motor at normal speeds transmits the higher frequencies to the motor mounts, these having a frequency typically above 30 Hz.

Although the theory of operation is not understood completely, it is a demonstratable fact that the use of the long flow path hydraulically interconnecting the chamber and enclosure, produces the results described. The chamber's rubber annulus can be designed so that it is adequately elastically flexible to absorb the high frequency vibrations, and this objective is not lost by the hydraulic fluid being, in effect, locked in the chamber when the mount carries the higher frequency vibration. At the low frequencies, the motor mount is very effectively damped by an alternating or vibrating flow of hydraulic fluid through the long flow path between the chamber and enclosure. Apparently when the interconnection between the chamber and enclosure is via a hydraulic fluid column of adequate length, the high frequency vibrations can also be transmitted through or into this column so that the chamber carrying the motor weight and having the rubber annulus does not stiffen as in the German patent design.

It follows from the above that it would be possible to make the motor mount with its mounting flange, motor connection and interconnecting rubber annulus forming the hydraulic chamber, as one unit, while providing the elastically expansible and contractible hydraulic enclosure as a second unit, with the two units interconnected by a metal or plastic tube having the ratio of length-to-diameter that has been described. The enclosure could be formed by interspaced plates interconnected by a rubber annulus. The two units could have different resonance frequencies when the mount carries the motor weight. A single enclosure could be connected to several of the motor mounts.

In any event, it is to be understood that the rubber components should be capable of resisting the hydraulic pressures inherently involved. The motor weight and vibration must be carried by the rubber annulus between the motor connection and the mounting flange and by the hydraulic fluid inside of this assembly, the resulting hydraulic pressure, in turn, being transmitted through the long flow path or tube to the elastically expansible enclosure formed by a rubber component which must, therefore, be designed to carry the hydraulic pressure transmitted to it.

Preferably this new motor mount is designed as an integrated unit. The rubber annulus interconnecting the motor connection and mounting flange is preferably arranged radially between the parts so that it is placed in shear by the weight of the motor. The enclosure can then be formed by a corresponding rubber annulus interconnecting the bottom of the flange with a bottom plate with this second rubber annulus also being designed to operate in shear. In other words, each annulus is made with an adequately thick wall and is radially positioned at an angle to the axis of the motor mount, the inner periphery of each annulus connecting with one of the parts and its outer periphery connecting with the other. This arrangement can provide two hydraulic chambers, one above the mounting flange and the other below the flange, with the two chambers interconnected by the long flow path that is fifty and preferably one-hundred times longer than its cross-sectional area or diameter.

This invention provides two ways for compactly providing the long flow path interconnection for such an integrated unit.

In one the flange is provided with a vertically extending tubular extension which can be upward or downward and via the outside of which the rubber annulus of either the upper or lower chamber is connected as the case may be. The inside of this extension has opposite ends which are respectively open to the upper and lower chambers. To get the long flow path a plug is press-fitted in the inside of this tubular extension, the plug being formed with a helical channel having opposite ends respectively opening into the upper and lower chambers. This provides a compact and easily manufactured unit.

In another form, the flange is made with an opening between the upper and lower chambers and has a downwardly open-sided groove which peripherally surrounds this opening. The open side of this groove is closed by a wall or plate which also closes the opening, this wall or plate having a hole on one side connecting the groove with one of the chambers, the groove having a side opening to the other one of the chambers. With the hole and side openings circumferentially interspaced, a flow path is formed that surrounds the flange opening with one end of the path opening to one chamber and the other end to the other chamber. In this way the necessary length-to-diameter ratio of the flow path can be provided.

DESCRIPTION OF THE DRAWINGS

The above mentioned examples are illustrated by the accompanying drawings, in which.

DETAILED DESCRIPTION OF THE DRAWINGS

Figure 1:
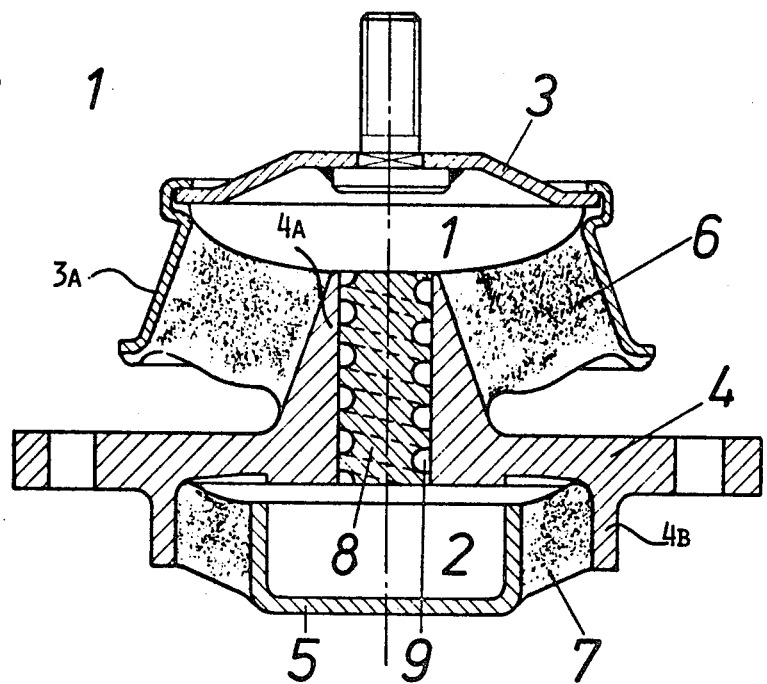
FIG. 1 is a vertical section showing the form using the flange having the tubular extension and helically grooved plug.

In FIG. 1 the upper hydraulic chamber is shown at 1 and the elastically expansible and contractible hydraulic enclosure or lower chamber is shown at 2. The motor connection or bearing 3 forms the top of the mount which connects with and receives the weight of the motor, and beneath the flange 4 a plate 5 forms the bottom of the lower chamber 2. The motor connection or bearing 3 is formed with a downwardly flaring skirt 3a and the flange 4 is made with an upstanding tubular projection 4a having a conical outside. The bottom of the flange 4 is formed with a downward extending annular skirt 4b, and the bottom plate member 5 is in the form of an upright cup. All of these parts are made of metal, such as steel. For the upper chamber 1, a thick-walled radial rubber annulus 6 is provided, the inner periphery of the annulus being vulcanized or otherwise firmly connneted to the outside of the flange extension 4a, the outer periphery of the annulus 6 being likewise connected to the inside of the skirt 3a of the motor connection 3.

For the lower chamber 2, a thick-walled radial rubber annulus 7 is arranged with its outer periphery connected to the inside of the skirt 4b of the flange 4, the inside periphery of the rubber annulus 7 being connected to the outside of the wall of the cup-shaped bottom member 5. The rubber-to-rubber metal connections can all be made by conventional techniques, such as by vulcanization of the rubber to the metal.

It can be seen that the extension 4a has its inside open to both of the chambers 1 and 2, this inside being in the form of a cylindrical bore. It is in this bore that the plug 8 is inserted, the plug being made of metal, plastic, rubber, etc., and being formed with the helical groove 9 which opens at its opposite ends into the chambers 1 and 2, respectively.

For illustrative purposes, the groove 9 is not shown to scale. This groove is closed on its radial outside by the flange extension 4a and should provide the flow path between the chambers 1 and 2 that is at least fifty times, and preferably one-hundred times, its cross-sectional area or diameter.

Each rubber annulus 6 and 7 carries the motor weight in shear. Both the chambers 1 and 2 and the flow path formed by the groove 9 are filled with hydraulic fluid which is not illustrated, to avoid a confusing illustration. The motor weight applied downwardly on the motor connection 3 causes downward deflection of the rubber annulus 6, pressuring the hydraulic fluid in the chamber 1 and via the flow path 9, upping the hydraulic pressure in the chamber 2 resulting in downward deflection of the lower rubber annulus 7. This condition is illustrated by FIG. 1.

The resilience of the annulus 6, together with the weight of the motor, provides a system inherently having a resonance frequency. This also applies to the parts forming the chamber 2, but the resonance frequency is different. The two systems are hydraulically interconnected by the long flow path 9.

When low frequency vibration is added to the motor weight on the connectionor bearing 3, the connection 2 is held against oscillation of large amplitude by the damping effected by the fluid in the chamber 2 via the flow path 9. Therefore, the annulus 6 can be designed to have sufficient elastic flexibility to insulate the flange 4 from the motor connection 3 insofar as concerns the high frequency vibration transmitted to the connection 3 by a motor of the reciprocating piston type and running within its normal operating range.

This insulation would not be provided if the flow path 9 were shortened below the ratio of 50:1 described. In that event, as the vibration frequency of the motor connection 3 increased, a frequency would be reached where the hydraulic fluid would, in effect, become locked in the chamber 1 with consequent stiffening of the motor mount. This condition is prevented by the length of the flow path 9.

Figure 2:
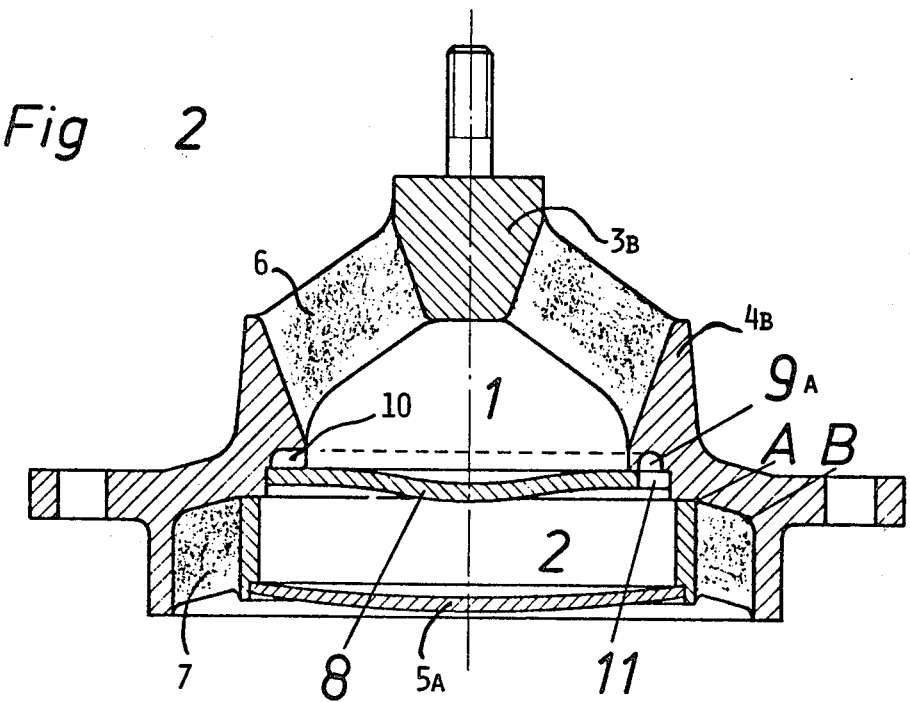
FIG. 2 is a vertical section showing the form wherein the flange has the opening and groove with the groove and opening closed by the plate.

FIG. 2 shows substantially the same parts, but in this case the mount is in the condition it has before receiving the motor weight. The flange forms a large opening having substantially the extent of the two chambers 1 and 2, this opening being peripherally surrounded by an upstanding annular extension 4b. The motor connection is in the form of a downwardly tapered stud 3b, the rubber annulus 6 being connected to the inside of the annular extension 4b and the outside of the stud 3b to define the upper chamber 1. The bottom plate or cup 5a is made as two interconnected pieces, but otherwise corresponds to the bottom plate or cup 5 of FIG. 1, the rubber annulus 7 being correspondingly arranged.

A large plate or disk 8 forms a wall closing the flange's opening and separating the chambers 1 and 2. The plate 8 also closes the bottom of an open-bottomed groove 9a formed in the bottom of the extension 4b of the flange. This groove 9a has a radial opening 10 to the chamber 1 and the plate 8 has a vertical opening 11 to the groove 9a. Therefore, the groove 9a can form the necessary long flow passage interconnecting the chambers 1 and 2. The letters A and B are to show that between the points they indicate the rubber annulus 7 is free from or unconnected with the flange as required to permit downward deflection of this rubber annulus.

In FIG. 2 the drawing as to the groove 9a is not drawn to scale. As shown, the flow path provided by the groove 9a extends for only 180°. The circumferential interspacing of the two ends of the groove 9a can be almost 360°, and although not shown, the groove 9 can be in the form of a flat spiral with the hole 11 opening to the outer spiral convolution and the opening 10 being at the inner convolution of the spiral. The operation of the FIG. 2 form is substantially as described in connection with the FIG. 1 form.

It can be seen that in both of the forms used to exemplify this invention, a compact unit is provided while at the same time accommodating the long flow interconnection between the chambers 1 and 2. The drawings do not illustrate the hydraulic fluid which fills both chambers and the flow path, to avoid confusing illustrations. This fluid would be permanently sealed within the motor mounts when they are made.

What is claimed is:

1. A hydraulically damped rubber motor mount comprising a mounting flange, a motor connection above the flange, a rubber annulus interconnecting the connection and flange and forming therewith a hydraulic chamber, an elastically expansible and contractible hydraulic enclosure, means for hydraulically interconnecting the chamber and enclosure via a flow path that is of substantially uniform cross-sectional area throughout its length and at least 50 times longer than its cross sectional area, and hydraulic fluid filling the chamber, enclosure and path.

2. The mount of claim 1 in which said path is at least one-hundred times longer than its cross-sectional area.

3. The mount of claim 1 in which said enclosure is formed by a plate below said flange and a rubber annulus interconnecting the plate and flange.

4. The mount of claim 3 in which said means is formed by said flange having a vertically extending tubular extension via the outside of which one of said annulus connects with the flange, the inside of the tubular extension having opposite ends which resepectively are open to said chamber and enclosure, and a plug which is fitted in said inside, the plug forming a helical channel having opposite end respectively opening into said chamber and enclosure.

5. The mount of claim 3 in which said means is formed by said flange forming an opening between said chamber and enclosure and a vertically open-sided groove which peripherally surrounds this opening with a wall closing said opening and the open side of the groove, the wall having a hole connecting the groove with one or the other of said chamber and enclosure and the groove having a side opening to the other one of the chamber and enclosure, the hole and side opening being circumferentially interspaced.

6. The mount of claims 1, 2, 3, 4 or 5 in which both of said annulus are radially positioned at an angle to the axis of the mount.

* * * * *